United States Patent
Hamann et al.

(10) Patent No.: US 8,148,863 B2
(45) Date of Patent: Apr. 3, 2012

(54) DRIVE ARRANGEMENT

(75) Inventors: Jens Hamann, Fürth (DE); Jürgen Krejtschi, Nürnberg (DE); Elmar Schäfers, Fürth (DE)

(73) Assignee: Siemens Aktiengesellschaft, Munich (DE)

( * ) Notice: Subject to any disclaimer, the term of this patent is extended or adjusted under 35 U.S.C. 154(b) by 272 days.

(21) Appl. No.: 12/516,014

(22) PCT Filed: Nov. 30, 2007

(86) PCT No.: PCT/EP2007/063082
§ 371 (c)(1),
(2), (4) Date: May 22, 2009

(87) PCT Pub. No.: WO2008/068201
PCT Pub. Date: Jun. 12, 2008

(65) Prior Publication Data
US 2010/0052450 A1 Mar. 4, 2010

(30) Foreign Application Priority Data
Dec. 4, 2006 (DE) .................. 10 2006 057 098

(51) Int. Cl.
*H02K 7/20* (2006.01)

(52) U.S. Cl. ........................................ 310/112
(58) Field of Classification Search .................. 310/112; 267/136; 425/587
See application file for complete search history.

(56) References Cited

U.S. PATENT DOCUMENTS

| | | | |
|---|---|---|---|
| 2003/0108640 A1 | 6/2003 | Nishizawa et al. | |
| 2005/0214405 A1* | 9/2005 | Matsumoto | 425/587 |

FOREIGN PATENT DOCUMENTS

| | | |
|---|---|---|
| DE | 196 14 936 A1 | 10/1997 |
| DE | 100 28 066 C1 | 12/2001 |
| JP | 60 125618 A | 7/1985 |
| JP | 32 39521 A | 10/1991 |

\* cited by examiner

*Primary Examiner* — Nguyen N Hanh

(57) ABSTRACT

A drive arrangement with a first motor and a second motor is described, the first and second motor being coupled via a first coupling unit. The first motor is provided to generate uniform low-frequency movements and the second motor performs a higher frequency alternating movement to be overlapped. The total movement is transmitted from the second motor to a machine component coupled via a second coupling unit. The first coupling unit is configured to transfer the uniform low-frequency movement of the first motor to the second motor, wherein a transmission of the higher frequency alternating movement of the second motor to the first motor is suppressed.

9 Claims, 1 Drawing Sheet

DRIVE ARRANGEMENT

CROSS REFERENCE TO RELATED APPLICATIONS

This application is the US National Stage of International Application No. PCT/EP2007/063082 filed Nov. 30, 2007 and claims the benefit thereof. The International Application claims the benefit of German Patent Application No. 10 2006 057 098.7 DE filed Dec. 4, 2006, both of the applications are incorporated by reference herein in their entirety.

FIELD OF INVENTION

The invention relates to a drive arrangement comprising at least two motors.

BACKGROUND OF INVENTION

A number of technical processes exist in which generation of a movement in a wide frequency range is necessary. In manufacturing there are plastic molding machines for example in which the distanglement method (e.g. for extrusion) is used. In this case the provision of both a uniform basic movement and also a higher-frequency alternating movement is necessary.

Known motors are usually tuned to the movement creation within a specific frequency range. Thus for example motors for generating low-frequency uniform movements are characterized by a high intrinsic inertia and inductance. These characteristics support the quality of the low-frequency movements for which these motors are designed. Such motors cannot however execute high-frequency movements satisfactorily, since the high intrinsic inertia would demand high torques with any dynamic movement conveyed, whereby higher-frequency movements of such motors are only able to be realized with a small amplitude. The high inductance of these motors also demands a high voltage to change the current flow, in order to change the torque and thus implement the dynamic movement.

SUMMARY OF INVENTION

An object of the invention is to specify a drive arrangement by means of which both a low-frequency, uniform movement and also a higher-frequency alternating movement are able to be effectively generated.

The object is achieved by a drive arrangement with a first motor for generating a uniform low-frequency movement of a machine component able to be coupled to the drive arrangement,
a second motor for generating a higher-frequency alternating movement of the machine component able to be coupled to the drive arrangement,
a first coupling member for coupling the first to the second motor, with the first coupling member being configured so that a transmission of the uniform low-frequency movement of the first motor to the second motor is made possible and that a transmission of the higher-frequency alternating movement of second motor is suppressed, and
a second coupling member for coupling the connectable machine component to the second motor.

The invention starts from the consideration that the at least two motors which are each designed for a different type of movement can be designed separately without them having a disruptive effect on each other during operation in their respective desired working areas. This results in the need to design the coupling members such that an undesired feedback between the motors is avoided.

By means of the first motor the drive arrangement covers a low-frequency frequency range, whereby a uniform movement is to be generated. Over and above this the second motor generates a higher-frequency alternating movement overlaid onto the movement of the first motor.

The first coupling member, by means of which the first and the second motor are coupled, is configured so that a transmission of the uniform low-frequency movement of the first motor to the second motor is made possible, with a transmission of the higher-frequency alternating movement of the second motor back to the first motor being suppressed however.

Thus in this case the first coupling member does not realize a fixed, rigid coupling between the first and the second motor, but instead a so-called "soft coupling".

The soft coupling exhibits a frequency-selective and dynamic behavior, so that by contrast with a so-called "rigid coupling" the two motors cannot simply mutually force their respective movements onto each other.

The first coupling member in this case preferably has a lowpass character or bandpass character, where necessary with delay properties. By selecting this property of the coupling member the feedback between the first and the second motor is able to be adjusted. With a lowpass behavior of the first coupling member the low-frequency uniform movements of the first motor are transmitted to the second motor for example, whereas the higher-frequency movements of the second motor as a result of the lowpass characteristics of the first coupling member cannot feed back to the first motor. Thus it is possible for the machine component connected to the second motor by means of the second coupling member, caused by the first motor, to be impressed with a uniform low-frequency movement and to be overlaid by the second motor with a higher-frequency alternating movement.

In an advantageous embodiment the second coupling member realizes a fixed, rigid coupling between the machine component and the second motor. This rigid, fixed coupling is designed to guarantee that both the uniform low-frequency movements transmitted by means of the second motor to the machine component and also the alternating movements can be transmitted almost uncorrupted and delay-free to the machine component.

In a further advantageous embodiment the first coupling member is realized by a belt or by a toothed belt which connects the first with the second motor.

A toothed belt realizes a soft coupling between the first and the second motor. The frequency-selective and delaying characteristics of the toothed belt can for example be set by the tension of the belt, by the belt material used, by the form and arrangement of the teeth of the belt or by different designs of the belt.

In a further advantageous embodiment the high-frequency alternating movement which is to be transmitted by means of the second motor to the coupled machine component, comprises a periodic movement pattern with a constant basic frequency.

The periodicity of the desired movement pattern makes it possible to exploit resonance characteristics in order to minimize the energy demand of the arrangement. In this case the resonant frequency which is determined by the movement of the system comprising the second motor and the machine component coupled thereto against the first motor corresponds to the basic frequency of the periodic movement pattern. This occurs through a corresponding layout of the first coupling member. In the synchronized state of the arrangement an ongoing conversion process between kinetic and potential energy then occurs, through which the desired alternating movement is maintained. Only the energy losses arising from attenuation and friction must by supplied. This makes the drive arrangement especially energy-efficient.

Advantageously the first coupling member realizes a soft coupling between the first and the second motor, and the second coupling member implements a rigid coupling between the second motor and the machine component.

As mentioned, resonance effects of the drive arrangement are able to be exploited by means of the suitably-selected first coupling member for energy minimization. The rigid coupling between the second motor and the machine component promotes the quality of the movement which is to be transmitted via the second motor to the coupled machine component.

In a further advantageous embodiment a resonant frequency of the overall system, comprising the first and the second motor, the first and the second coupling member as well as the machine component coupled to the second motor by means of the second coupling member is tuned to the basic frequency of the desired periodic movement pattern. The first coupling member in this case is a means to make this tuning possible.

In this process a rotor of the first motor is advantageously coupled to a rotor of the second motor by means of the first coupling member.

When this is done and electromechanical connection between the first and the second motor can be established by means of the first coupling member with the desired and non-desired interactions between the first and the second motor being able to be defined by means of the properties of the first coupling member.

Especially advantageously in this case the coupling of a rotor of the first motor to the rotor of the second motor is effected by means of a closed-loop drive control of the second motor.

The close-loop drive control of the second motor represents the first coupling member in this case by means of which the mechanical components rotor of the first motor and a rotor of the second motor can be coupled to one another, with the drive dynamics of the drive arrangement able to be adjusted and adapted to current requirements by means of a parameterization of the closed-loop drive control of the second motor.

In summary it can be stated that by means of the drive arrangement at least two motors are provided, with the one being designed for a basic load in relation to the machine component to be coupled to it, and at least one further motor for an alternating load. The alternating load is in this case overlaid onto the basic load. The transmission of the movement to the second motor by means of the machine component coupled to the second coupling member is undertaken via the second motor; the movement of the first motor is transmitted by means of the first coupling member to the second motor with the basic load movement transmitted from the first motor to the second motor being overlaid onto the alternating load movement by the second motor. The layout of the first coupling member is undertaken frequency-selectively and if necessary delaying so that the transmission of the basic load movements (low-frequency, uniform movement) to the second motor is made possible but the reverse transmission of the alternating movement from the second motor to the first motor is suppressed (soft coupling).

By exploiting resonance effects, whereby the drive dynamics of the drive arrangement are influenced by means of the first coupling member, the energy requirement of the drive arrangement can be minimized.

BRIEF DESCRIPTION OF THE DRAWINGS

Three exemplary embodiments of the invention are explained in greater detail below.

The figures show.

Electronic components or mechanical components which are identical or similar are labeled by the same reference numbers.

DETAILED DESCRIPTION OF INVENTION

Figure 1:
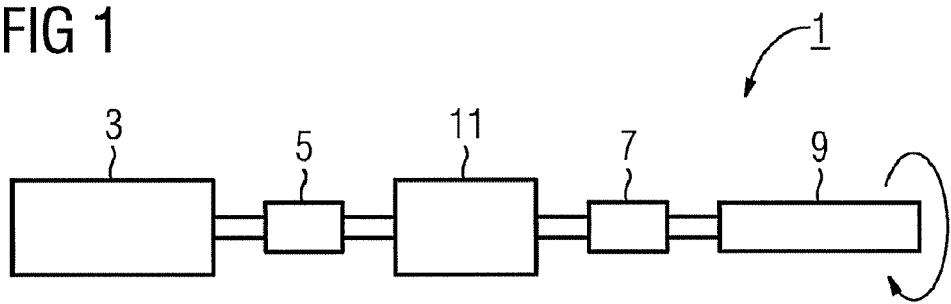
FIG. 1 a schematic diagram of a drive arrangement.

FIG. 1 shows a schematic diagram of a drive arrangement 1. A machine component 9 is intended in this case to preferably execute rotational movements, whereby a uniform, low-frequency basic load and also a higher-frequency alternating load are to be transmitted to the machine component 9.

A first motor 3 is provided for realizing the low-frequency uniform movement (basic load). A second motor 11 is available for the high-frequency alternating movement. The drive arrangement comprises the first motor 3, the second motor 11, and also first coupling member 5 for coupling the first 3 motor to the second motor 11 and a second coupling member 7. The second coupling member 7 is intended and implemented for coupling in the machine component 9 and is preferably a rigid coupling to guarantee the quality of the transmission of the basic and alternating movement to the machine component. Via the second motor 11 both the lower-frequency basic movement and also the higher-frequency alternating movement are transmitted by means of the second coupling member 7 to the machine component 9. For this purpose it is necessary to transmit to the second motor 11 the low-frequency basic movement which is generated by means of the first motor 3. The first coupling member 5 is provided for this purpose by means of which the transmission of the low-frequency basic movement to the second motor 11 is guaranteed, in which case however the alternating movement to be generated by means of the second motor 11 should not have any feedback effect on the first motor 3. Therefore the first coupling member 5 is designed to be frequency-selective, for example with a lowpass or bandpass character. The first coupling member 5 comprises a spring in damper element, which together with the inertia of the second motor 11 of the second coupling element 7 and of the machine component 9 as load, produces a dynamically explicitly tuned system with lowpass character and resonant frequency position.

Figure 2:
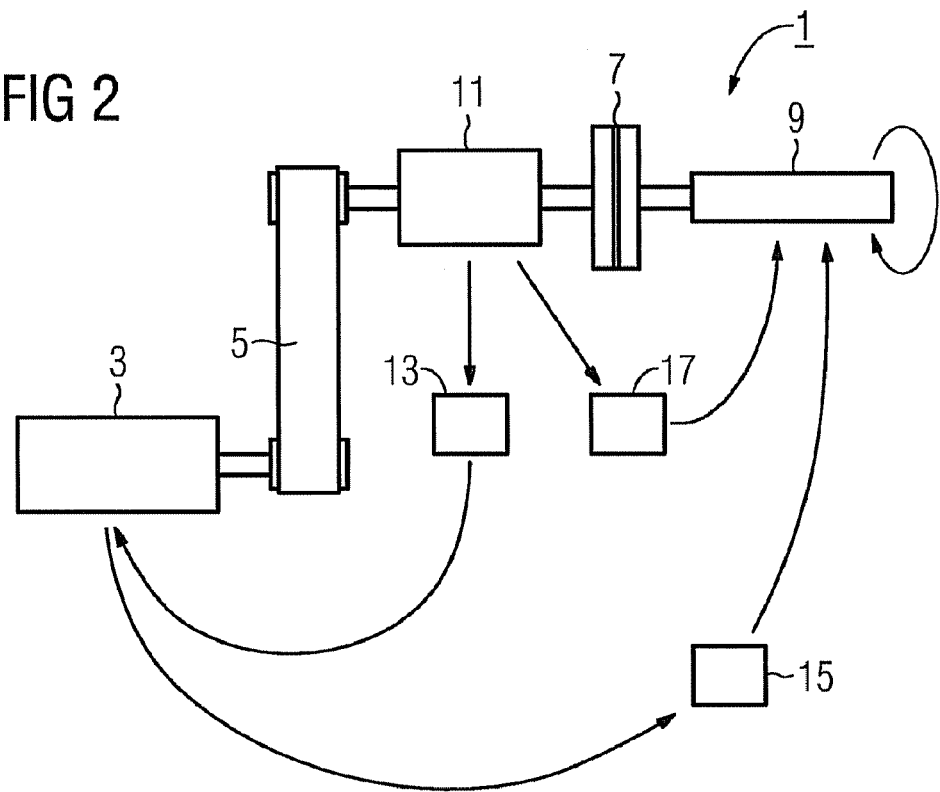
FIG. 2 an extrusion machine as a typical embodiment of the drive arrangement, and FIG. 3 a further embodiment of the drive arrangement with a closed-loop drive control as the first coupling member.

FIG. 2 shows a further embodiment of a drive arrangement 1, characterized as an extrusion machine.

With an extrusion machine it is necessary to generate a uniform low-frequency movement and to overlay this with a higher-frequency alternating movement. To generate the low-frequency uniform movement a first motor 3 is provided which is preferably designed as an asynchronous machine. This first motor 3 is coupled by means of a first coupling member 5, which is implemented as a toothed belt, to a second motor 11. The first coupling member 5 implemented as a toothed belt in this case effects a soft coupling between the first 3 and the second motor 11. A first transmission function 13 is realized by this which suppresses a feedback of the alternating movement of the second motor 11 to the first motor 3. On the other hand a transmission of the uniform low-frequency movement from the first motor 3 via the first coupling member 5 to the second motor 11 and thus via a second coupling member 7 to the machine component 9 is made possible, so that a second transmission function 15 is realized such that the transmission of the uniform low-frequency movement of the first motor 3 to the machine component 9 is made possible.

The low-frequency automating movement is generated by means of the second motor and transmitted via a rigid coupling by means of this second coupling member to the machine component 9. A third transmission function 17 which describes the transmission behavior between the second motor 11 and the machine component 9 consequently exhibits a pass-through behavior in relation to the higher-frequency alternating movement of the second motor 11 to the machine component 9.

In this exemplary embodiment the first motor is designed as an asynchronous machine as already mentioned which supplies the production process with a torque which is as constant as possible and consequently takes care of the desired low-frequency uniform movement. The second motor 11 is preferably designed as an asynchronous machine which allows a higher-frequency dynamic torque generation. With this the higher-frequency alternating movement to be overlaid is generated. The first coupling member 5 realizes an adapted soft coupling between the first motor 3 and the second motor 11, with a transmission of high-frequency movements from the second motor 11 to the first motor 3 being largely suppressed. Only by this method can an acceleration caused by the first motor 3 be effectively prevented by the second motor 11. This design of the first coupling member 5 consequently enables the first 3 and the second motor 11 to be planned into the project separately in each case for the task areas demanded of them. In particular in such cases the second motor 11 can be designed without taking into account the inertia of the first motor 3.

If the higher-frequency alternating movement, which is to be realized by the second motor 11, involves a periodic movement pattern with a constant basic frequency, by a corresponding layout of the first coupling member 5. an exploitation of resonance effects in the movement generation can be employed in order to minimize the energy requirements. In such cases a resonant frequency which is characterized by the movement of a system comprising the second motor 11 and the machine component 9 (preferably the extruder rotor) against the first motor 3, corresponds to the basic frequency of the periodic movement pattern. The result able to be achieved by this is that essentially only the losses occurring through attenuation and friction must be fed through the motor. In the synchronized state and ongoing conversion process between kinetic and potential energy is undertaken, with the desired oscillation movement being maintained.

Figure 3:
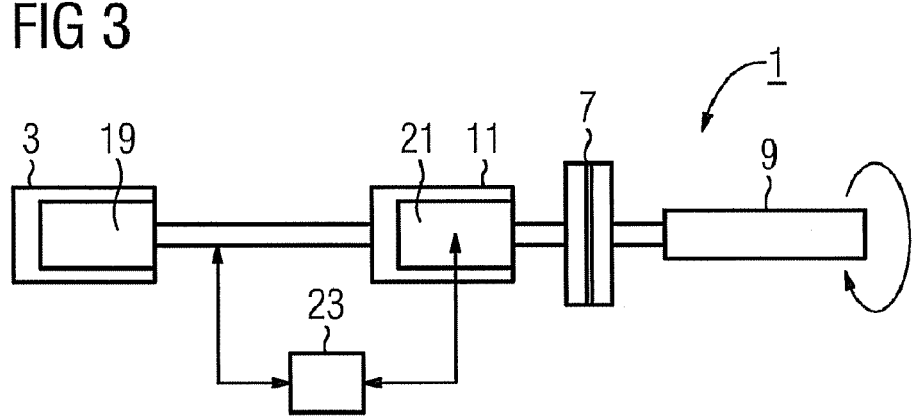

FIG. 3 shows a further embodiment of a drive arrangement 1, with the first coupling member being embodied as a closed-loop drive control of the second motor 11.

This is based on the consideration that an adaptation of the resonant frequency to the respective requirements of the production process to be operated is possible with a suitable design of the first coupling member 5. In FIG. 2 the first coupling member 5 involves a mechanical solution to realize a coupling between the first motor 3 and the second motor 11. By contrast with this, FIG. 3 shows the provision of an electromechanical coupling between the rotor of the first motor 3 and the rotor of the second motor 11. In this case a rotor 19 of the first motor 3 is coupled by means of the first coupling member 5 to the rotor 21 of the second motor 11. The first coupling member 5 in this case is preferably a closed-loop drive control 23 of the second motor 11. The mechanical components rotor 19 and rotor 21 are thus in this case coupled by means of the closed-loop drive control 23. Usually closed-loop drive controls are of a digital design and able to be freely parameterized. Consequently the first coupling member 5 in FIG. 3 involves a parametrizable coupling member, of which the characteristics, especially frequency-selective, can be set by parameterization of the closed-loop drive control 23. It is thus possible to change the drive dynamics of the drive arrangement 1 by means of parameterization of the closed-loop drive control 23 and to adapt them to current requirements. The attenuation and stiffness of the coupling of the rotors of the first motor 3 and the second motor 11 is accordingly able to be flexibly adapted to meet the current requirements of the arrangement, in accordance with the equation $$M\mu_2 = f(K_p, T_n, K_v, \Delta\phi, \Delta\omega).$$

The invention claimed is:

1. A drive arrangement, comprising:
a machine component;
a first motor with a constant torque for generating a uniform movement of the machine component;
a second motor with a dynamic torque for generating an alternating movement of the machine component;
a first coupling unit for coupling the first motor to the second motor,
wherein the first coupling unit transfers the uniform movement of the first motor to the second motor, and
wherein the first coupling unit suppresses a transmission of the alternating movement of the second motor to the first motor; and
a second coupling unit for coupling the machine component to the second motor.

2. The drive arrangement as claimed in claim 1, wherein the first coupling unit is a toothed belt.

3. The drive arrangement as claimed in claim 1, wherein the alternating movement comprises a periodic movement pattern with a constant basic frequency.

4. The drive arrangement as claimed in claim 3, wherein the first coupling unit is a soft coupling between the first motor and the second motor, and wherein the second coupling unit is a rigid coupling between the second motor and the machine component.

5. The drive arrangement as claimed in claim 4, wherein a resonant frequency of a system comprising the first motor, the second motor, the first coupling unit, the second coupling unit and the machine component are tuned to the basic frequency of the periodic movement pattern.

6. The drive arrangement as claimed in claim 5, wherein the resonant frequency is tuned by the first coupling unit.

7. The drive arrangement as claimed in claim 6, wherein the first coupling unit includes a coupling of a rotor of the first motor to a rotor of the second motor.

8. The drive arrangement as claimed in claim 7, further comprising:
a closed-loop drive control of the second motor, wherein the closed-loop drive control is the coupling of the rotor of the first motor to the rotor of the second motor.

9. The drive arrangement as claimed in claim 1, wherein the drive arrangement is an extrusion machine, the first motor is a asynchronous machine and the second motor is a synchronous machine.

* * * * *